US008322142B2

(12) United States Patent
Armstrong et al.

(10) Patent No.: US 8,322,142 B2
(45) Date of Patent: Dec. 4, 2012

(54) TRAPPED VORTEX COMBUSTION CHAMBER

(75) Inventors: Jeffrey P. Armstrong, Exeter, NH (US); Toni H. Stamenov, Portsmouth, NH (US)

(73) Assignee: FlexEnergy Energy Systems, Inc., Irvine, CA (US)

( * ) Notice: Subject to any disclaimer, the term of this patent is extended or adjusted under 35 U.S.C. 154(b) by 1162 days.

(21) Appl. No.: 11/742,925

(22) Filed: May 1, 2007

(65) Prior Publication Data
US 2008/0271703 A1 Nov. 6, 2008

(51) Int. Cl.
F02C 1/00 (2006.01)
(52) U.S. Cl. ......................................... 60/737
(58) Field of Classification Search ............... 60/733, 60/737, 746, 748, 752–760
See application file for complete search history.

(56) References Cited

U.S. PATENT DOCUMENTS

| | | | | |
|---|---|---|---|---|
| 2,999,359 A * | 9/1961 | Murray | ............................ | 60/733 |
| 3,485,566 A | 12/1969 | Schoppe | | |
| 4,054,028 A | 10/1977 | Kawaguchi | | |
| 5,319,935 A | 6/1994 | Toon et al. | | |
| 5,609,655 A | 3/1997 | Kesseli et al. | | |
| 5,619,855 A | 4/1997 | Burrus | | |
| 5,791,148 A | 8/1998 | Burrus | | |
| 6,151,899 A | 11/2000 | Park | | |
| 6,253,555 B1 * | 7/2001 | Willis | ............................ | 60/737 |
| 6,286,298 B1 | 9/2001 | Burrus et al. | | |
| 6,286,317 B1 | 9/2001 | Burrus et al. | | |
| 6,295,801 B1 | 10/2001 | Burrus et al. | | |
| 6,481,209 B1 | 11/2002 | Johnson et al. | | |
| 6,951,108 B2 | 10/2005 | Burrus et al. | | |
| 7,003,961 B2 | 2/2006 | Kendrick et al. | | |
| 2002/0112482 A1 | 8/2002 | Johnson et al. | | |
| 2004/0020211 A1 | 2/2004 | Kendrick et al. | | |
| 2004/0103663 A1 | 6/2004 | Haynes et al. | | |
| 2004/0226300 A1 | 11/2004 | Stuttaford et al. | | |
| 2006/0162337 A1 | 7/2006 | Stuttaford et al. | | |
| 2007/0022758 A1 | 2/2007 | Myers et al. | | |

OTHER PUBLICATIONS

Zelina, J., et al., "Utra-Compact Combustors for Advanced Gas Turbine Engines", Proceedings of ASME Turbo Expo, Power for Land, Sea, and Air, Vienna, Austria, GT2004-53155, Jun. 2004.
Crane, John, et al., "Stagnation-Point Reverse-Flow Combustor Performance with Liquid Fuel Injection", Proceedings of GT2006, ASME Turbo Expo 2006: Power for Land, Sea, and Air, Barcelona, Spain, GT2006-91338, May 2006.

(Continued)

Primary Examiner — Phutthiwat Wongwian
(74) Attorney, Agent, or Firm — McDermott Will & Emery LLP

(57) ABSTRACT

A combustor for a gas turbine engine is disclosed which is able to operate with high combustion efficiency, and low nitrous oxide emissions during gas turbine operations. The combustor consists of a can-type configuration which combusts fuel premixed with air and delivers the hot gases to a turbine. Fuel is premixed with air and is delivered to the combustor with a high degree of swirl motion. This swirling mixture of reactants is conveyed through a flowpath that expands; the mixture reacts, and establishes a central recirculation zone. An imperforate trapped vortex cavity is disposed proximal to the swirler apparatus which provides for a second reaction zone. Fresh fuel/air reactants are exchanged with burned products in the trapped vortex and a pilot flame is established in the trapped cavity. The imperforate trapped cavity is not supplied with either fuel or air, but is cooled on a backside of the cavity with a flow of cooling air. The cooling air is then conveyed to the combustion chamber so as to not interfere with the critical flame holding flow features of the combustor.

12 Claims, 9 Drawing Sheets

OTHER PUBLICATIONS

Lewis, George, D., "Swirling Flow Combustion—Fundamentals and Application", AIAA Paper No. 73-1250, AIAA/SAE 9th Propulsion Conference, Las Vegas, Nevada, Nov. 1973.

Hsu, K.-Y., et al., "Performance of a Trapped Vortex Combustor", AIAA Paper No. 95-0810, 33rd Aerospace Sciences Meeting and Exhibit, Reno, Nevada, Jan. 1995.

PCT/US07/67928 International Search Report dated May 1, 2007.

* cited by examiner

TRAPPED VORTEX COMBUSTION CHAMBER

FIELD OF THE INVENTION

The present invention relates to a combustion system and a method of combusting fuels.

BACKGROUND

Air pollution is a concern for apparatuses which burn hydrocarbon fuels with air. Gas turbines and, more specifically, microturbines, which are used to generate electricity and hot exhaust gases used in cogenerative applications are increasingly subject to air emission restrictions. These turbines are sometimes known as industrial gas turbine generators (ITGs). The air emission restrictions are imposed by governmental regulatory organizations such as the California Air Resources Board, the states of Texas and New Jersey, and other governmental bodies. These restrictions may regulate the emission of oxides of nitrogen (NOx), carbon monoxide (CO), and volatile organic compounds (VOC's). Gas turbine engine manufacturers are obliged to develop improved combustion methods and apparatus configurations to satisfy these restrictions while also satisfying turbine engine operation requirements at full-power and low-power operation.

The low emissions combustors used in ITG engines combust a premixed combination of fuel and air. The mixture of fuel and air is typically lean of the stoichiometric apportionment of fuel and air in order to limit flame temperatures and reduce gaseous emissions. By "lean" it is meant that an excess amount of air is mixed with the fuel, and not all the oxygen in the air is consumed in the reaction. When the fuel is composed of a gaseous fuel, such as natural gas, digester gas, landfill gas, syngas derived from gasification or pyrolysis processes, or other hydrocarbon gas mixtures, the gas fuel is premixed with air prior to combustion. This is commonly referred to as "lean premixed" (LP) combustion. When the fuel is liquid, such as jet fuel, diesel, kerosene, or other liquid fuel, the fuel must be both vaporized and mixed prior to combustion. This method is referred to as "lean, premixed, prevaporized" (LPP) combustion.

Both LP and LPP combustion methods are capable of combusting fuel with low levels of NOx, CO, and VOC's. The lean fuel/air mixture combusts at low gas temperatures, avoiding high-temperature regions that produce NOx. The LP or LPP are also typically designed to burn hot enough, and for sufficient residence-times, to fully oxidize carbon monoxide (CO) to carbon dioxide (CO2) and unburned hydrocarbons and other VOC's to water (H2O) and carbon dioxide (CO2).

A typical LP and LPP combustor can burn fuel with low emissions over a limited range of fuel/air mixtures. The mixture must remain lean enough to avoid the production of NOx. This lean mixture is typically close to the lean flame extinction limit, also known as the lean blowout (LBO) limit. When gas turbines are required to produce less than full power ("part-power"), the combustor typically receives less fuel, which decreases the fuel/air ratio, inducing LBO. Gas turbine combustors sometimes include a second source of fuel (pilot) which is injected into the combustor without premixing the fuel with air. The pilot fuel burns in a "diffusion" mode, where the flame front is locally controlled by the diffusion of fuel and air (oxygen) together. Diffusion flames burn at higher temperatures and produce higher levels of NOx, but permit gas turbines to operate at part-power.

SUMMARY

In one embodiment, the invention provides a combustor for combusting a mixture of fuel and air. The combustor includes a swirlerhead for receiving a flow of air and a flow of fuel, the fuel and air being mixed together under the influence of the swirlerhead, the swirlerhead imparting a swirling flow to the fuel/air mixture. A prechamber is in fluid communication with the swirlerhead for receiving the swirling fuel/air mixture, the prechamber being a cylindrical member oriented along a central axis, the prechamber imparting an axial flow to the swirling fuel/air mixture in a downstream direction along the central axis, thereby creating a vortex flow of the fuel/air mixture having a low pressure region along the central axis. A combustion chamber is in fluid communication with and downstream of the prechamber, the combustion chamber having a greater flow area than a flow area of the prechamber, thereby permitting the vortex to expand radially and create a recirculation zone in which combustion products from combustion of the fuel/air within the combustion chamber are drawn upstream along the central axis back into the prechamber. A trapped vortex chamber is disposed radially outwardly from the prechamber, the trapped vortex having an imperforate wall defining a cavity, the trapped vortex chamber receiving fuel/air from an outer perimeter of the vortex into the cavity and exhausting combustion products into the vortex.

In another embodiment, the invention provides a method of combusting fuel and air in a gas turbine engine. Fuel and air is premixed to a relatively uniform mixture. The fuel/air mixture is injected into a prechamber cylinder in a swirling motion about a centerline of the prechamber, thereby creating a vortex having a low pressure region at the centerline. The vortex is conveyed axially in a downstream direction into a combustion chamber having greater flow area than a flow area of the prechamber. The vortex is expanded into the combustion chamber, wherein chemical reaction of the fuel and air occurs to form hot products of combustion. The expansion forms a recirculation zone at the centerline wherein the hot products are drawn upstream into the prechamber. Fuel/air from an outer perimeter of the vortex is trapped within a trapped vortex chamber disposed radially outwardly from the prechamber upstream of the combustion chamber. The fuel/air within the trapped vortex chamber has about the same fuel/air ratio as the fuel/air mixture in the combustion chamber. A swirling flow is induced within the trapped vortex chamber, the swirling trapped vortex flow rotating about the centerline of the prechamber, wherein chemical reaction of the fuel and air within the trapped vortex chamber occurs to form hot products of combustion. A shear flow of hot products of combustion is provided along an inner perimeter of the vortex flow from the recirculation zone and along an outer perimeter of the vortex flow from the trapped vortex flow.

Other aspects of the invention will become apparent by consideration of the detailed description and accompanying drawings.

DETAILED DESCRIPTION

Figure 1:
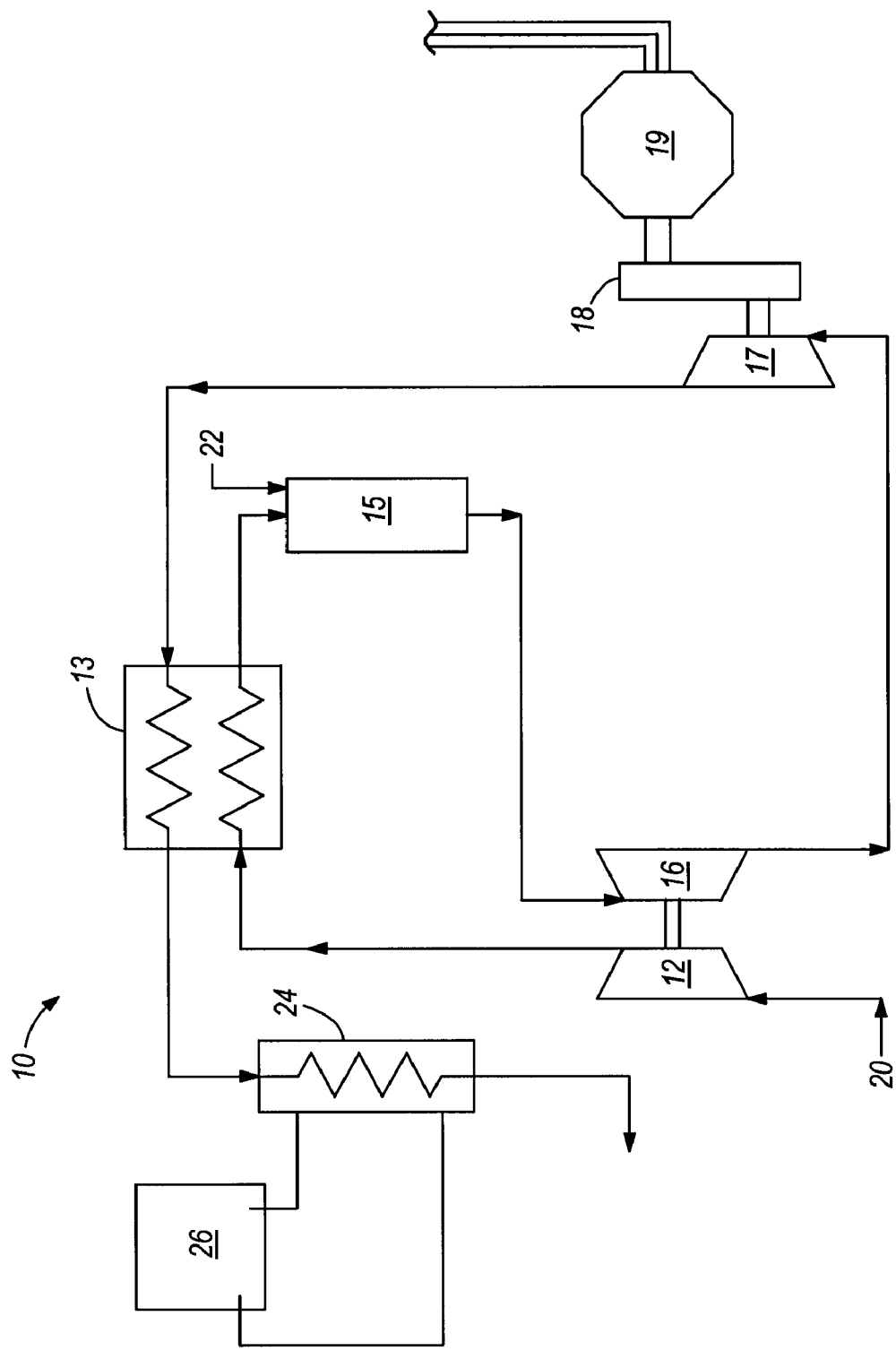
FIG. 1 is a schematic illustration of a recuperated, two-spool gas turbine engine including a combustor for use with an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The invention described herein can be used for burning various hydrocarbon fuels in a gas turbine. The combustion process comprises a method to burn LP and LPP fuel/air (F/A) mixtures such that the onset of LBO is delayed to leaner F/A mixtures. This enables lower gas turbine exhaust emissions (NOx, CO, VOC's) at a wider range of operating engine conditions.

Referring now to the drawings, like numerals are used throughout to refer to like elements within a gas turbine and combustor.

FIG. 1 schematically illustrates a recuperated gas turbine engine 10 having a two spool configuration used for generating electricity. The engine 10 includes a compressor 12, a recuperator 13, a combustion chamber 15, a gasifier turbine 16, a power turbine 17, a gearbox 18, and an electric generator 19. The engine 10 communicates with an air source 20 upstream of compressor 12. The air is compressed and routed into recuperator 13. In recuperator 13, the compressed air is preheated by exhaust gases from the power turbine 17 and routed into the combustion chamber 15. Fuel 22 is then added to the combustion chamber 15 and the mixture is combusted (as described in greater detail below).

The products of combustion from the combustion chamber 15 are routed into gasifier turbine 16. The F/A ratio is regulated (i.e. the flow of fuel is regulated) to produce either a preset turbine inlet temperature or preset electrical power output from generator 19. Turbine inlet temperature entering gasifier turbine 16 can range within practical limits between 1500 F and 2000 F. The hot gases are routed sequentially first through the gasifier turbine 16 and then through the power turbine 17. Work is extracted from each turbine to respectively transfer power to the compressor 12 and the generator 19, with shaft power transferred through gearbox 18. The hot exhaust gases from the power turbine 17 are then conveyed through the recuperator 13, where heat is transferred by means of thermal convection and conduction to the air entering the combustion chamber 15. An optional heat capturing device 24 can be used to further capture the exhaust heat for productive commercial uses. Heat capturing device 24 can be used to supply hot water, steam, or other heated fluid to device 26 which uses said heat for a variety of purposes.

Figure 2:
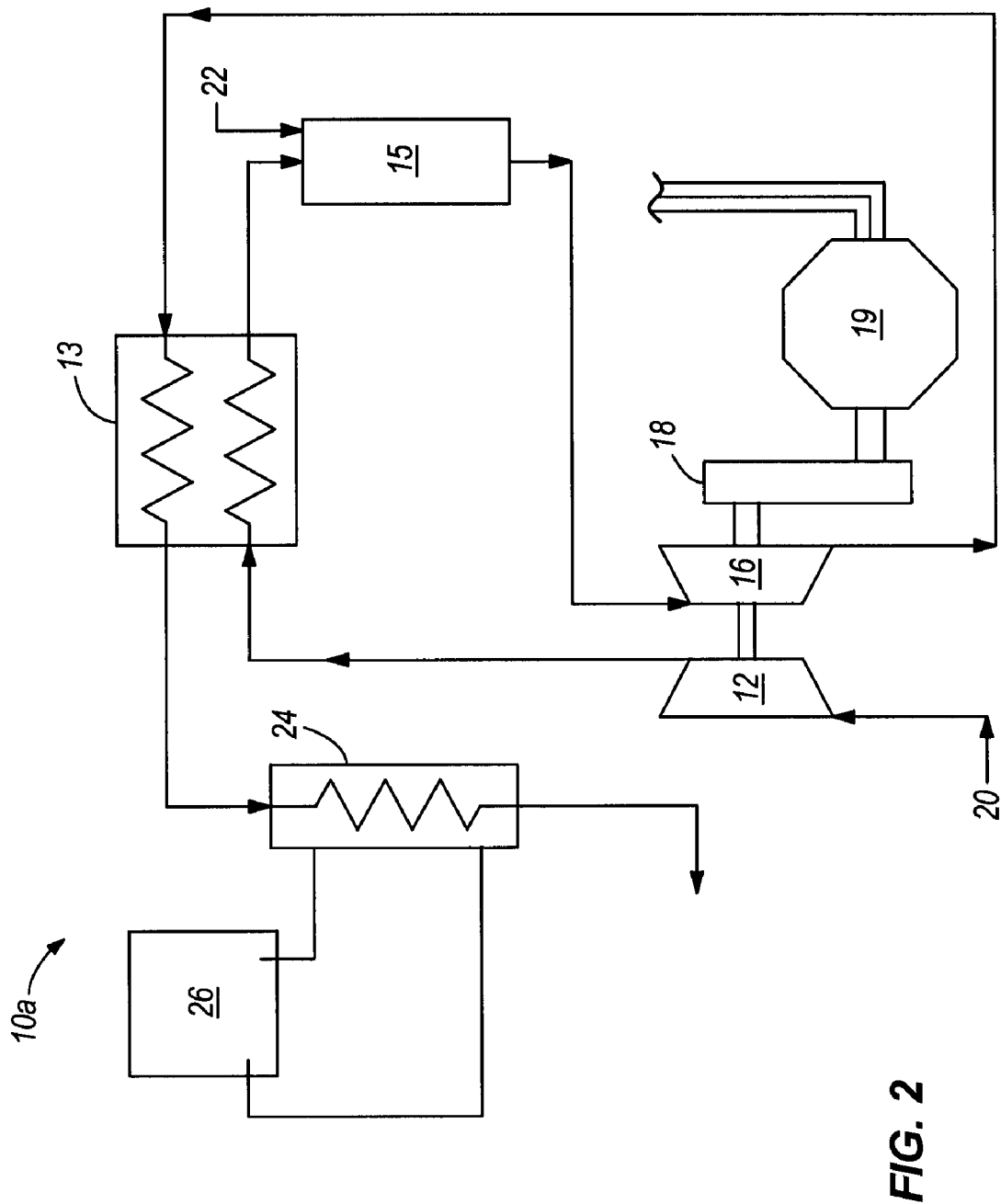
FIG. 2 is a schematic illustration of a recuperated, single-spool gas turbine engine including a combustor for use with an embodiment of the invention.

FIG. 2 schematically illustrates a recuperated gas turbine engine 10a used for generating electricity. Gas turbine 10a is similar to FIG. 1, with the exception that only a single turbine is used. The engine 10a includes a compressor 12, a recuperator 13, a combustion chamber 15, a turbine 16, a gearbox 18, and an electric generator 19. The engine 10a communicates with an air source 20 upstream of compressor 12. The air is compressed and routed into recuperator 13. In recuperator 13, the compressed air is preheated by exhaust gases from turbine 16 and routed into the combustion chamber 15. Fuel 22 is then added to the combustion chamber 15 and the mixture is combusted (as described in greater detail below).

The products of combustion from the combustion chamber 15 are routed into turbine 16. The F/A ratio is regulated (i.e. the flow of fuel is regulated) to produce either a preset turbine inlet temperature to turbine 16 or preset electrical power output from generator 19. Turbine inlet temperature can range within practical limits between 1500 F and 2000 F. Work is extracted from the turbine to transfer power to both compressor 12 and the generator 19, with shaft power transferred through gearbox 18. The hot exhaust gases from turbine 16 are then conveyed through the recuperator 13, where heat is transferred by means of thermal convection and conduction to the air entering the combustion chamber 15. An optional heat capturing device 24 can be used to further capture the exhaust heat for productive commercial uses. Heat capturing device 24 can be used to supply hot water, steam, or other heated fluid to device 26 which uses the heat for a variety of purposes.

Figure 3:
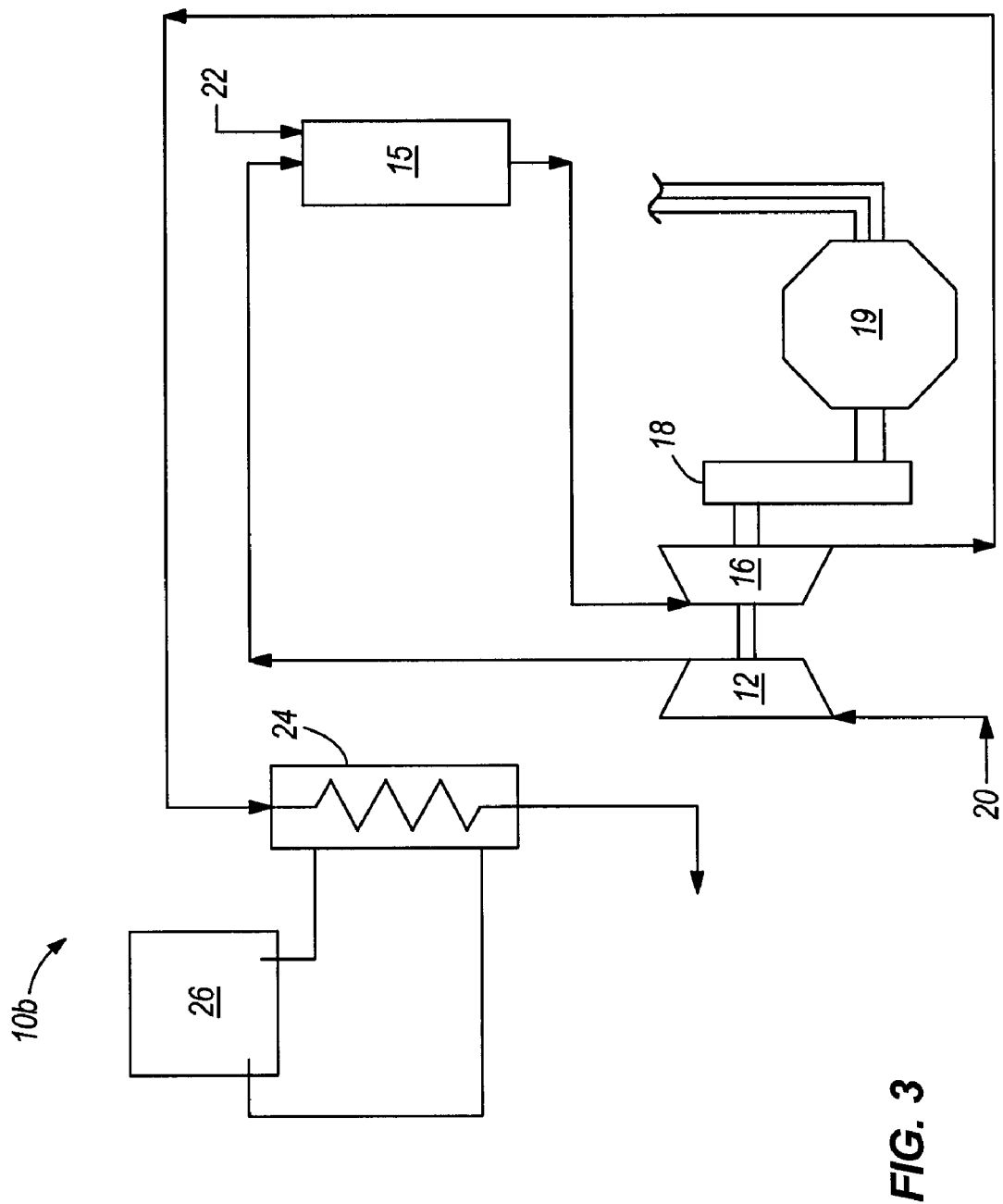
FIG. 3 is a schematic illustration of a simple-cycle, single-spool gas turbine engine including a combustor for use with an embodiment of the invention.

FIG. 3 schematically illustrates a simple-cycle gas turbine engine 10b used for generating electricity. Gas turbine 10b is similar to FIG. 2, with the exception that no recuperator exists. The engine 10b includes a compressor 12, a combustion chamber 15, a turbine 16, a gearbox 18, and an electric generator 19. The engine 10b communicates with an air source 20 upstream of compressor 12. The air is compressed and routed into combustion chamber 15. Fuel 22 is then added to the combustion chamber 15 and the mixture is combusted (as described in greater detail below).

The products of combustion from the combustion chamber 15 are routed into turbine 16. The F/A ratio is regulated (i.e. the flow of fuel is regulated) to produce either a preset turbine inlet temperature or preset electrical power output from generator 19. Turbine inlet temperature to turbine 16 can range within practical limits between 1500 F and 2000 F. Work is extracted from the turbine 16 to transfer power to both compressor 12 and the generator 19, with shaft power transferred through gearbox 18. The hot exhaust gases from turbine 16 are then conveyed to either the exhaust, or an optional heat capturing device 24 can be used to further capture the exhaust heat for productive commercial uses. The heat capturing device 24 can be used to supply hot water, steam, or other heated fluid to device 26 which uses said heat for a variety of purposes.

FIGS. 1-3 illustrate gas turbine component arrangements that can be used with various embodiments of the invention. A variety of other engine configurations (multiple spools, multiple compressor and turbine stages) could also be used in conjunction with the invention. For example, instead of using gearbox 18 and generator 19, one could use a high-speed generator to generate a high-frequency alternating current (AC) power signal, and then use a frequency inverter to convert this to a direct current signal (DC). This DC power could then be converted back to an AC power supplied at a variety of typical frequencies (i.e. 60 Hz or 50 Hz). The invention is not limited to the gas turbine configurations of FIGS. 1-3, but includes other component combinations that rely on the Brayton cycle to produce electric power and hot exhaust gases useful for hot water generation, steam generation, absorption chillers, or other heat-driven devices.

Figure 4:
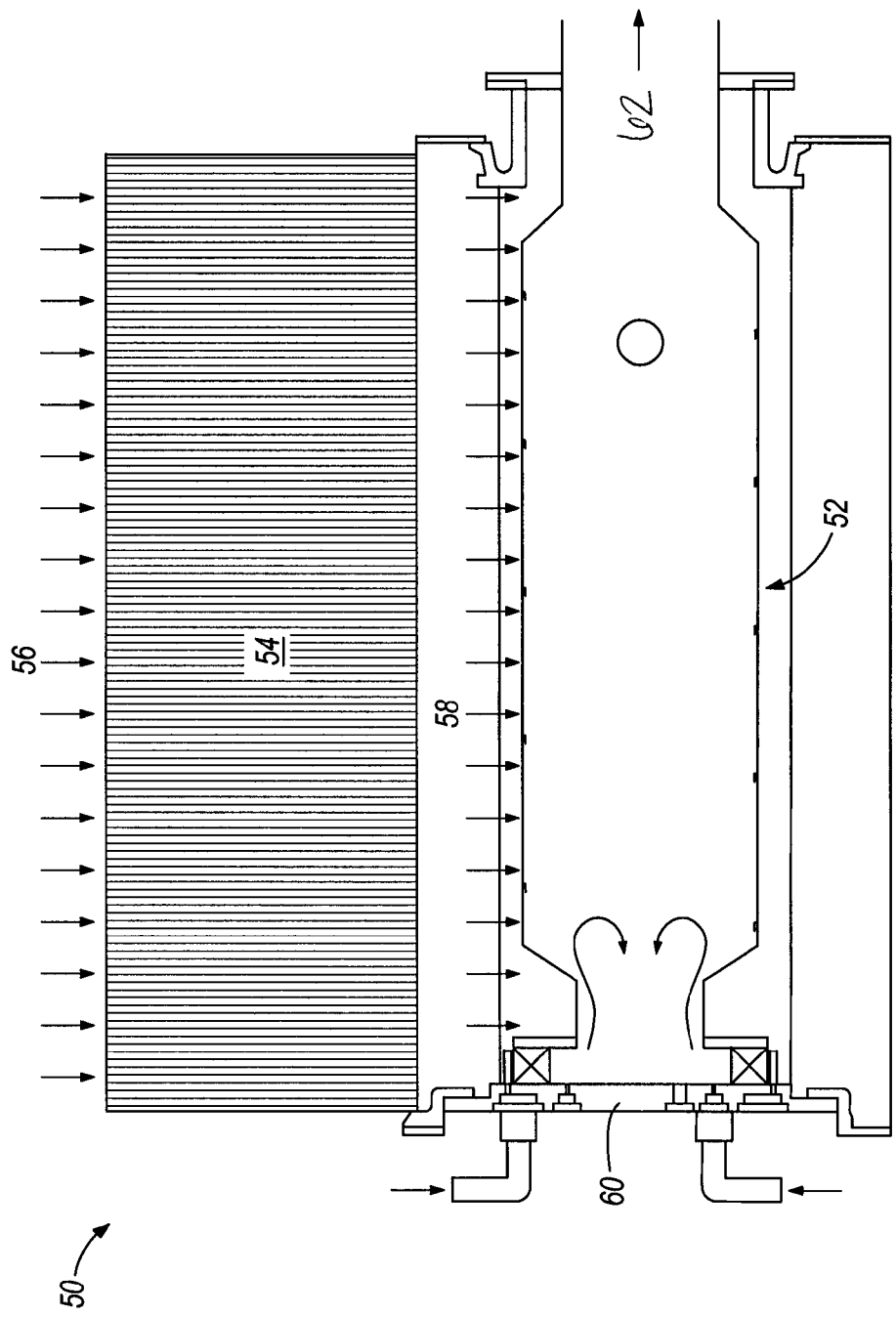
FIG. 4 is a schematic illustration of a can- or silo-type combustor inside a recuperator for use with an embodiment of the present invention.

FIG. 4 illustrates a recuperator 50. Recuperator 50 can be similar to the recuperator disclosed in U.S. Pat. No. 5,983,992, issued Nov. 16, 1999, the entire contents of which are incorporated herein by reference. The recuperator 50 includes a plurality of stacked cells 54 that are open at each end to an inlet manifold 56 and an outlet manifold 58 and which route the flow of compressed air from the inlet manifold 56 to the outlet manifold 58. Between the cells 54 are exhaust gas flow paths that guide the flow of hot exhaust gas between the cells 54. There are fins in the cells 54 and in the exhaust gas flow paths to facilitate the transfer of heat from the hot exhaust gas to the cooler compressed air mixture.

With continued reference to FIG. 4, the outlet manifold 58 contains a silo or tubular combustor 52 and a swirlerhead 60. Air entering outlet manifold 58 flows around the outside of the combustor 52. The air then flows into the combustor 52 through a variety of orifices and slots in combustor 52 and swirlerhead 60, and exits the combustor 52 with a flow as indicated by arrow 62. The overall flow 62 of the air in the combustor 52 can be considered to define an orientation of the combustor 52 with the flow 62 being oriented in a downstream direction, i.e., from left to right, such that the swirlerhead 60 is upstream of the combustor 52.

Figure 5:
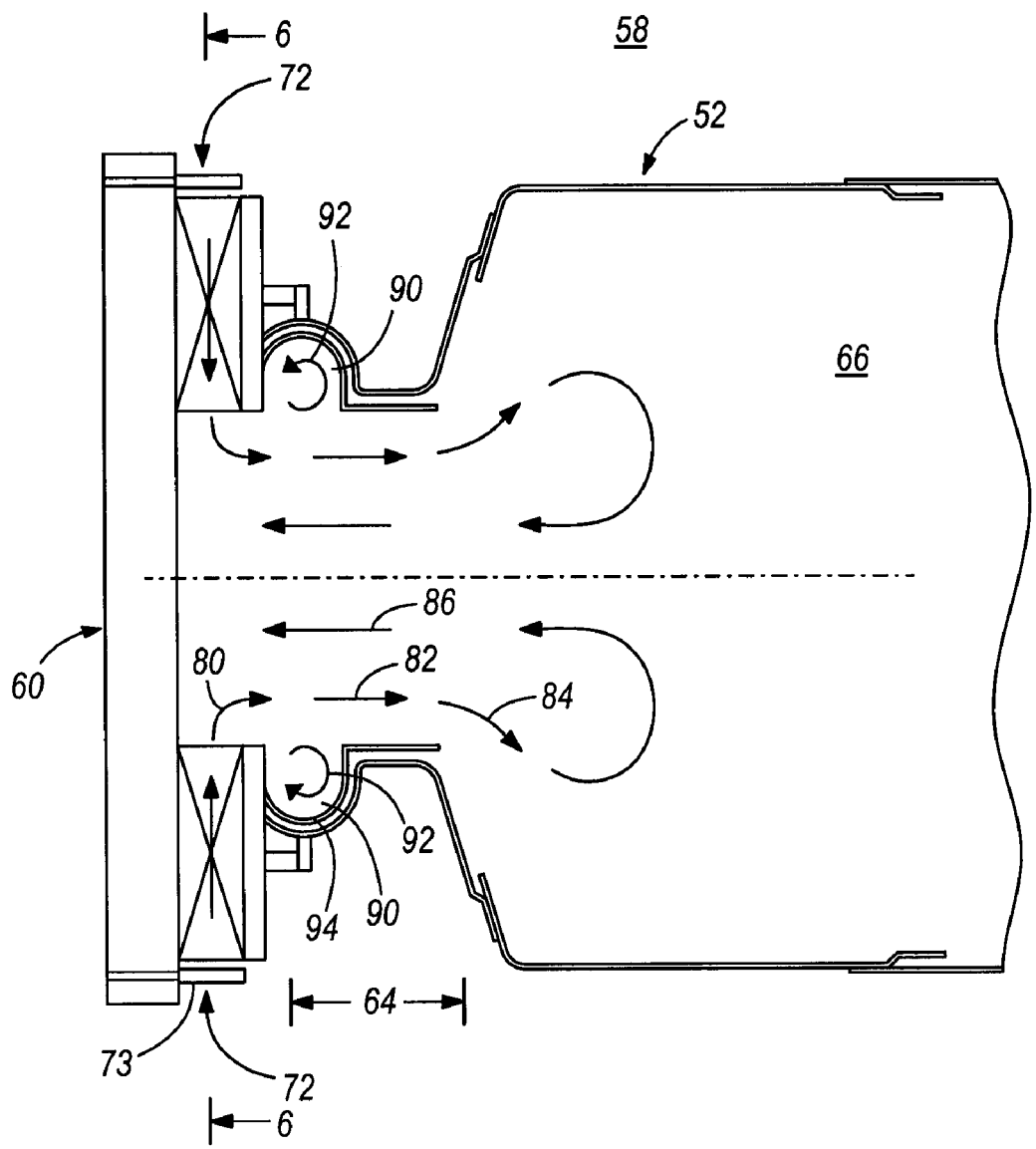
FIG. 5 is a schematic illustration of a swirlerhead, prechamber and combustion chamber according to an embodiment of the invention.

FIG. 5 shows a cross-sectional view of the swirlerhead 60 and a portion of the combustor 52. The combustor 52 includes a prechamber 64 and a combustion chamber 66 that is downstream of the prechamber 64. As illustrated, the prechamber 64 has a smaller diameter than the combustion chamber 66. Compressed air from the outlet manifold 58 is conveyed sequentially through swirlerhead 60 to prechamber 64, and then to combustion chamber 66, inside combustor 52. Air flows into the prechamber 64 through a plurality of slots 67 in swirlerhead 60. Air pressure in the outlet manifold 58 is higher than the air pressure inside the combustion chamber 66, and this pressure difference provides the energy potential to convey air through flow slots 67.

Figure 6:
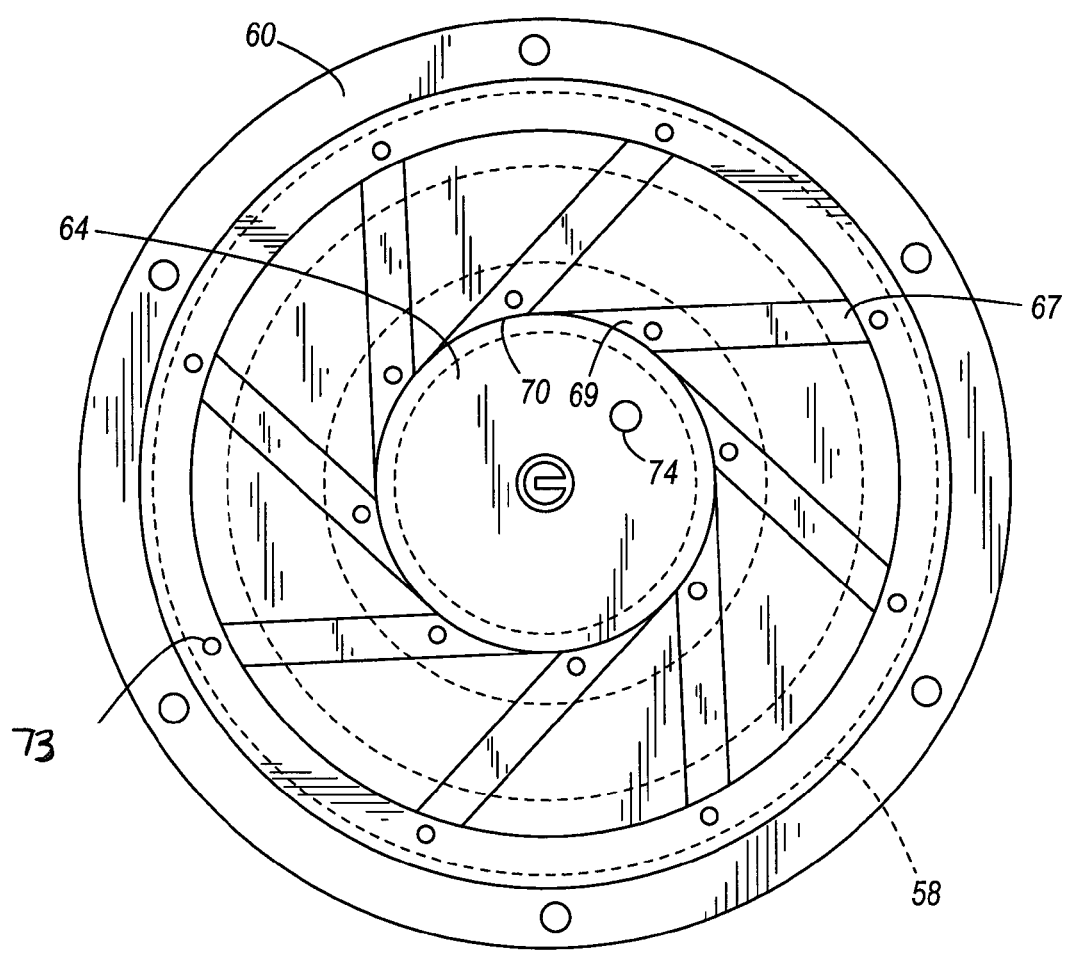
FIG. 6 is an end view of a radial swirler for use with an embodiment of the invention.

FIG. 6 shows an end view of swirlerhead 60. Air is driven from outside the swirlerhead 60, through swirl slots 67, as indicated by arrow 72 (see FIG. 5), to the prechamber 64. Swirl slots 67 are oriented to inject the air into the prechamber 64 with a high degree of swirl about a centerline or central axis A of the cylindrical prechamber 64. In the illustrated embodiment, the prechamber 64 and the combustion chamber 66 are coaxial. Swirl slots 67 terminate with at least one slot wall tangent to a prechamber wall 70. Gaseous or liquid fuel can be injected at location 72 with one or a number of apertures from the wall or from a fuel injection cylinder or tube 73 with holes in it (see FIG. 5). By injecting the fuel at the entrance to the swirl slot 67, the fuel and air have adequate time to thoroughly mix prior to exiting the slot 67. This uniform mixture of F/A avoids fuel-rich burning in combustion chamber 66, which could lead to high levels of NOx. In other embodiments, fuel could be injected at a plurality of other locations also, so as to ensure the F/A mixture leaving the swirl slots 67 uniformly mixed.

With continued reference to FIG. 6, an electronic ignitor, flame torch, or other ignition device 74 is located between the centerline A of the prechamber 42 and the inside diameter of the slot 67 exits. The ignitor 74 ignites the premixed F/A exiting slots 67, but is not subjected to the high temperatures of an inner recirculation zone 86 (FIG. 5).

As shown in FIG. 5, premixed F/A is injected into the prechamber 64 with a swirling flow path or directionality under the influence of the action of the swirlerhead 60 as indicated by arrow 80. Other structures may be provided to impart a swirl to the F/A mixture and introduce it to the prechamber 64. For example, an axial swirler could also convey the F/A mixture with a high degree of swirl. A swirler that has both radial and axial velocity components is also possible.

With continued reference to FIG. 5, the swirling F/A mixture 80 is conveyed in a downstream direction through the prechamber 64 and exits the prechamber 64 into the combustion chamber 66. This axial motion is combined with a swirling motion about the centerline axis A of the combustion chamber 66, producing a vortex motion, as indicated by arrow 82. This vortex 82 creates a pressure difference between the center of the vortex 82, located at the centerline A, and the inner perimeter of the prechamber 64. The centerline of the vortex 82 is at a lower pressure than the outside edge of the vortex 82, similar to the low pressure experienced at the center of a hurricane.

The flow area in the combustion chamber 66 has a larger cross-sectional area than the flow area in the prechamber 64 (i.e., the combustion chamber 66 has a greater inner diameter than the prechamber 64). When the axially processing vortex 82 enters the combustion chamber 66, the increase in flow area causes the vortex 84 to expand radially outward and slow its axial and rotational or swirling movement, as indicated by arrow 84. The expansion of the vortex 84 reduces the pressure difference between outside edge of the vortex 84 and the center. Thus, the centerline of the prechamber 64 is at a lower pressure than the centerline of the combustion chamber 66. An inner recirculation zone as indicated by arrow 86 is established which pulls a portion of the gases from the combustion chamber 66 back into the prechamber 64 in an upstream direction, i.e., from right to left. This process is referred to herein as a "vortex breakdown" structure and stabilizes the flame in the combustion chamber 66.

The F/A mixture conveyed from the prechamber 64 to the combustion chamber 66 chemically reacts in a combustion flame. The products of combustion are hotter than the reactants introduced into the prechamber 64 (i.e., the premixed F/A at flow 80). The inner recirculation zone 86 therefore is composed of hot products of combustion. The flow of the inner recirculation zone 86 is directionally opposed to the unburned F/A mixture of 82, and an inner shear layer is established between the two. Hot gas products and combustion radicals, which are unstable electrically-charged molecules like OH—, O—, and CH+ are exchanged with the unburned F/A of flow 82. Flow 86 serves as a continued ignition source for flow 82. The chemical radicals also enhance the reactivity of the unburned mixture of flow 82, enabling the F/A mixture of flow 82 to extinguish combustion at a lower F/A ratio than if flow 82 did not have the radicals from flow 86.

With continued reference to FIG. 5, the combustor 52 further includes a trapped vortex chamber 90 provided in the prechamber 64. The trapped vortex chamber 90 is an annular recess or cavity disposed at a radial periphery of the prechamber 64. An inner radius of the trapped vortex chamber 90 is open to the prechamber 64. An outer periphery and sides of the trapped vortex chamber 90 are defined by an imperforate liner or wall 94.

As the F/A mixture in flow 82 is conveyed downstream from the swirlerhead 60 through the prechamber 64 in a swirling motion, the F/A mixture at a periphery of the prechamber 64 is trapped in the trapped vortex chamber 90. The axial velocity component of flow 82 encourages a separate, annular processing vortex flow 92 within the trapped vortex chamber 90. The F/A flow 92 in the trapped vortex chamber 90 is both rotating, as shown in FIG. 5, as well as swirling around the centerline A of the prechamber 64.

Combustion chemical reaction occurs within the trapped vortex chamber 90 resulting from autoignition of the F/A mixture 92. Autoignition is the ignition of an F/A mixture at temperatures above the autoignition temperature for an F/A mixture to ignite. Autoignition includes the requirement to keep an F/A mixture above a specified temperature for a specific time (ignition delay time). Once ignited, combustion will continue in the trapped vortex chamber 90 due to continued circulation of the trapped vortex flow 92 about the centerline A of the prechamber 64. The residence time of the gases 92 inside the trapped vortex chamber 90 are believed to be longer than needed for complete combustion. The ignited trapped vortex flow 92 serves as a pilot flame for igniting the vortex flow 82. Alternately, or in combination, combustion chemical reaction occurs within the trapped vortex chamber 90 resulting from flame propagation from the ignitor 64 through vortex flow 82 and into the trapped vortex chamber 90.

Figure 7:
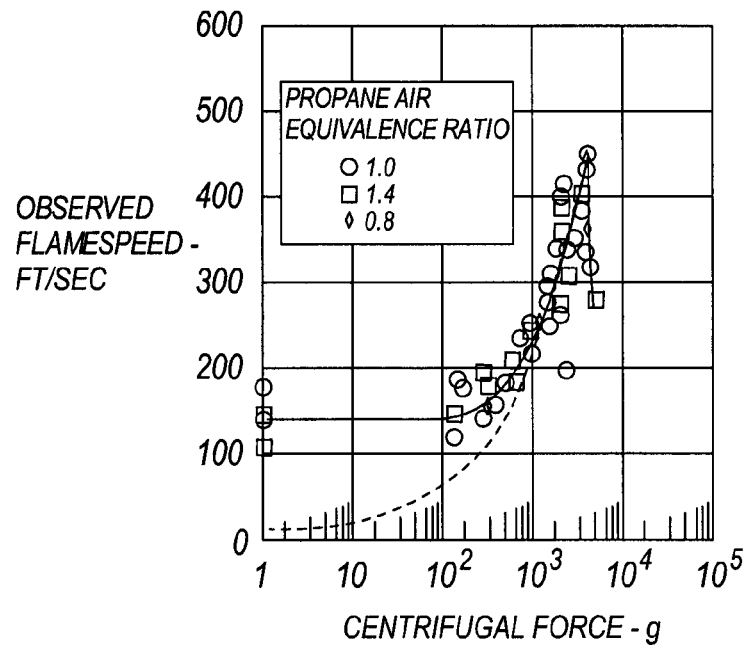
FIG. 7 is a graph of flame speed versus g-load.

With respect to combustion within the trapped vortex chamber 90, chemical reactions can occur at higher rates within the trapped vortex chamber 90 due to high g-loading. The observed flame speed of an F/A mixture increases with increasing centrifugal force or "g-load" on an F/A mixture. A peak increase can occur with a g-load around 3500, above which flame speed can start to decrease. FIG. 7 illustrates the relationship between g-load and flame speed. The trapped vortex chamber 90 leverages the high swirl created by the swirling flow 82 to increase flame speeds within the trapped vortex chamber 90. The g-load is calculated from the following equation:

$$g = \frac{V_{tan}^2}{g_c r_{trap}}$$

Where $V_{tan}$ is the velocity of the air circling about the prechamber centerline A, $r_{trap}$ is the radius of the inner edge of the trapped vortex chamber 90, and $g_c$ is the acceleration of gravity.

Flame speed is an inherent measure of ability of a chemical reaction to release heat. The higher flame speeds in the trapped vortex chamber 90, enabled by the high g-loads, serve to complete the combustion reactions faster and also enables the F/A mixture of flow 92 to stay lit at leaner (lower F/A) conditions.

Unburned F/A leaving swirl slots 67 at flow 80 turbulently diffuses across a shear layer established between the trapped vortex flow 92 and the prechamber flow 82. Air and fresh fuel reactants in the air are exchanged across the shear layer between 82 and 92. Burned combustion products and chemical radicals also exit the trapped vortex chamber 90 and mix with flow 82.

Note that exchange of fresh F/A from flow 82 to flow 92 is also encouraged by the density gradient between the two flows. The unburned, colder F/A mixture of flow 82 has a higher density than that of flow 92, which is at a higher temperature. The swirling motion within the prechamber 64 establishes an unstable flow pattern, where higher density gases are swirling inside of a lower density flow in the trapped vortex chamber 90. This density differential promotes gaseous exchange between flows 82 and 92.

As shown in FIG. 5, the flow of unburned F/A of flow 82 is bounded at its inner radius by the hot inner recirculation flow or zone 86 and at its outer radius by a secondary hot trapped vortex flow or zone 92. Both boundaries or zones are serving to ignite the unburned F/A flow 82, so that the unburned F/A is ignited from two sources, and infuse chemical radicals from two shear layers to further increase the reactivity of flow 82. This method of combustion therefore can postpone flame extinguishment relative to a traditional premixed combustor that uses a vortex-breakdown structure to establish an inner recirculation zone alone.

Figure 8:
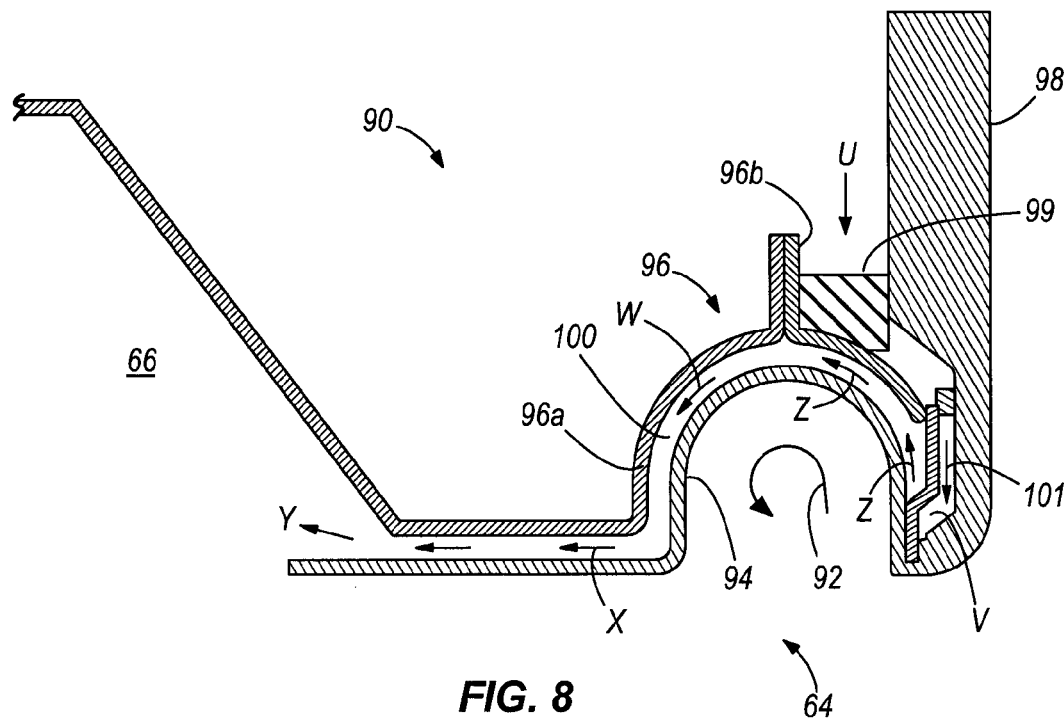
FIG. 8 is a schematic of a trapped vortex chamber according to another embodiment of the invention.

With continued reference to FIGS. 5 and 8, the trapped vortex chamber 90 is formed of an imperforate wall 94. Neither fuel nor air is injected into the trapped vortex chamber 90. Rather, the flow of fuel and air into the trapped vortex chamber 90 is provided by premixed F/A from within the combustor 52, i.e., flow 82 from the prechamber 64. Injection of fuel, air or a fuel/air mixture into the trapped vortex chamber 90 could interfere with the swirling, rotating flow pattern established within the trapped vortex chamber 90, reducing g-loads and residence times within the trapped vortex chamber 90. Injection of fuel, air or a fuel/air mixture into the trapped vortex chamber 90 would result in variations in the fuel/air composition of the trapped vortex chamber 90 depending on whether the engine was being operated at full power or low power. Flame extinction within the trapped vortex chamber 90 could occur due to the purging effect of the air injected into the trapped vortex chamber 90, reducing the exchange of chemical radicals with the vortex flow 82 and ignition of the prechamber vortex flow 82.

Injection of air alone into the trapped vortex chamber 90 could result in a leaning of the F/A ratio in the trapped vortex chamber 90 and LBO within the trapped vortex chamber 90. Injection of fuel alone into the trapped vortex chamber 90 could richen the F/A ratio in the trapped vortex chamber 90, resulting in overheating of the trapped vortex chamber 90 and high levels of NOx production. Increased heat production within the trapped vortex chamber 90 would require additional costly fuel injection manifolds and cooling features. Direct injection of both fuel and air into the trapped vortex chamber 90 could create a diffusion flame, which can result in locally richer combustion spots producing higher levels of NOx. Because fuel and air within the trapped vortex chamber 90 is provided solely through the flow of premixed fuel and air from the prechamber 64, the F/A ratio within the trapped vortex chamber 90 is equivalent to that of the combustion chamber 66 and excess NOx production is avoided.

Combustion in the trapped vortex chamber 90 will cause heat to be transferred into the combustor liner walls, including the trapped vortex chamber wall 94. A cooling system is provided for maintaining wall temperatures at acceptable levels to achieve long component life.

Figure 9:
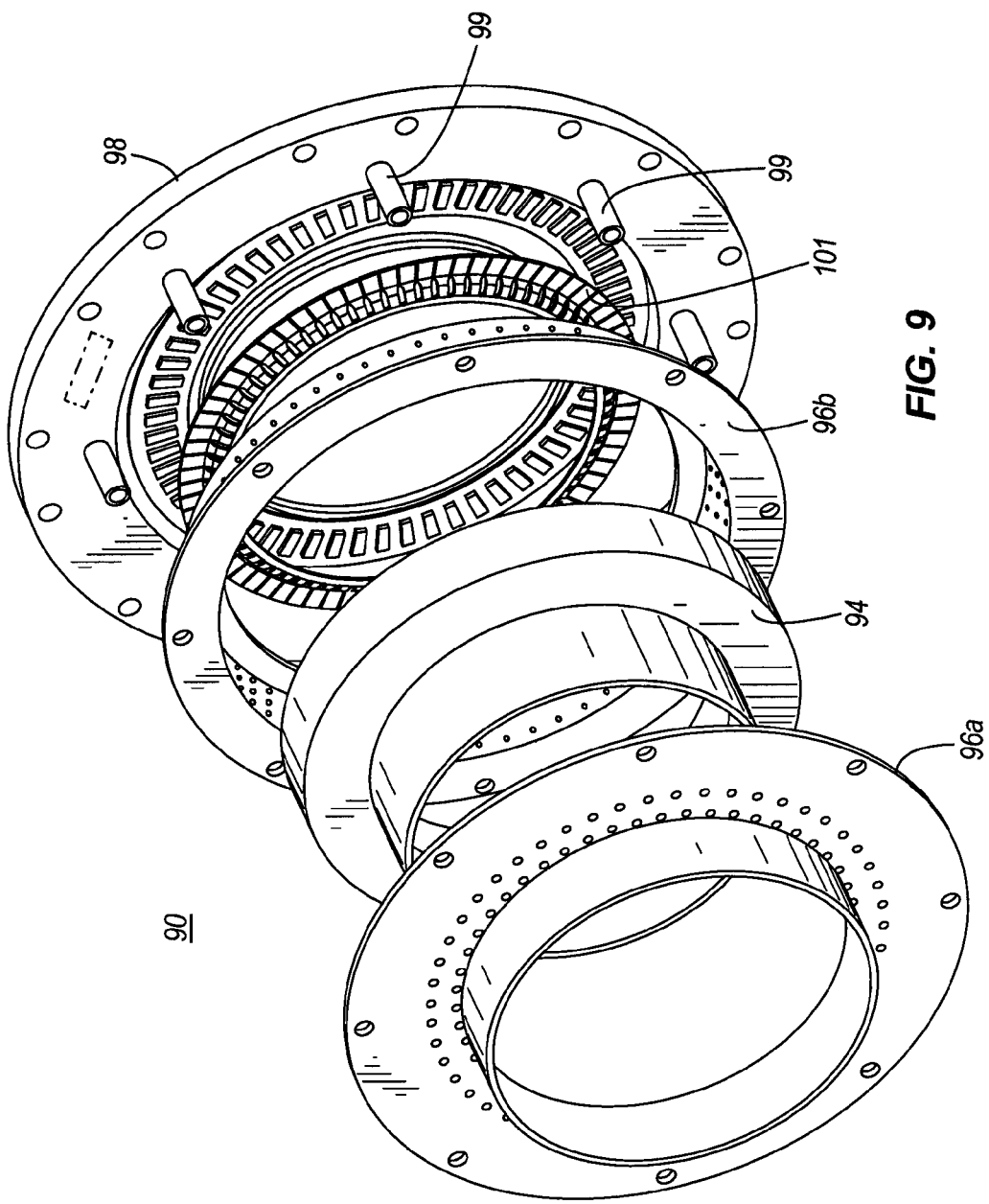
FIG. 9 is an exploded view of the trapped vortex chamber according to an embodiment of the invention.

To cool the inner liner or wall 94 around the trapped vortex chamber 90, wherein combustion reactions are occurring, passive backside convection cooling of the liner 94 can be provided. FIGS. 8 and 9 illustrate construction of the trapped vortex chamber 90 according to an embodiment of the invention. An outer liner 96 is coupled between a flange 98 at an upstream end of the prechamber 64 and a downstream end of the prechamber 64. In the illustrated embodiment, the outer liner 96 includes first and second portions 96a, 96b coupled to one another and to the flange 98 with fasteners (not shown)

and spacers 99. The outer liner 96 is spaced apart from the liner 94, creating a gap 100 therebetween.

Cool air from the recuperator outlet manifold 58 enters the gap 100 at U, flows in the gap 100 between the liners 94, 96 over an outer or backside of the liner 94 and exhausts into the combustion chamber 66 downstream of the vortex flow 82. In the embodiment illustrated in FIG. 8, air is sequentially flowed from U to V to W to X to Y by a means of holes, slots, and openings. The outer liner 96 includes apertures which convey jets (flow Z) of air onto the backside of the liner 94. These jets also cool the liner 94. The air from flows U and Z is conveyed in the gap 100 between the two liners 94, 96 and is exhausted into the main combustion chamber 66 with flow Y.

Because the liner 94 is imperforate, as previously discussed, at no point is the backside cooling air (i.e., flows U, V, W, X, Y, Z) permitted to enter or interfere with the reacting flow 92 within the trapped vortex chamber 90. Also of note, flow Y enters combustion chamber 66 at a location downstream of the prechamber 64 so as not to cool the inner recirculation zone 86 or otherwise interfere with the flame holding flow features, including, for example, vortex flow 82.

One skilled in the art of combustion design could apply other methods of backside cooling of trap liner 94. For instance, bumps or ribs could be situated on liner 94 to enhance the cooling convection. In addition, or alternately, a plasma-sprayed thermal barrier coating, such as a partially stabilized zirconia, can be applied to the hot (inner) surface of the liner 94.

In the illustrated embodiment, the air at flow U is recuperator air, which can have a temperature of about 1100 F. While this is a high temperature, the temperatures within the trapped vortex chamber 90 can be in excess of about 2400 F. In other embodiments, cooling air flow U can be from other sources, including, for example, compressor discharge air.

In the illustrated embodiment, the trapped vortex chamber 90 is provided with a radial slip feature in the form of ring 101. The ring 101 includes slots and/or apertures for permitting the flow of cooling air therethrough from flow V to flow W. The outer liner portions 96a, 96b are secured together with fasteners, such as screws, that fit through the spacers 99, to the flange 98. The inner liner 94 is coupled to the ring 101 by, for example, welding or adhering, at their inner diameters, but not to the flange 98. When the liner 94/ring 101 assembly is pressed to the flange 98 with the fasteners through outer liner portions 96a, 96b, the inner surface between the flange 98 and the ring 101 is not connected to one another other than a clamping force holding them together. This configuration permits the liner 94/ring 101 assembly to expand in a radial direction when the trapped vortex chamber 90 heats up during combustion without creating thermal stresses. This can reduce creep distortion and fatigue cracking of the components of the trapped vortex chamber 90, including the liner 94. Furthermore, if the liner 94 and the ring 101 are permanently secured to one another, this assembly can easily be removed and replaced because it is only clamped into place.

Figure 10:
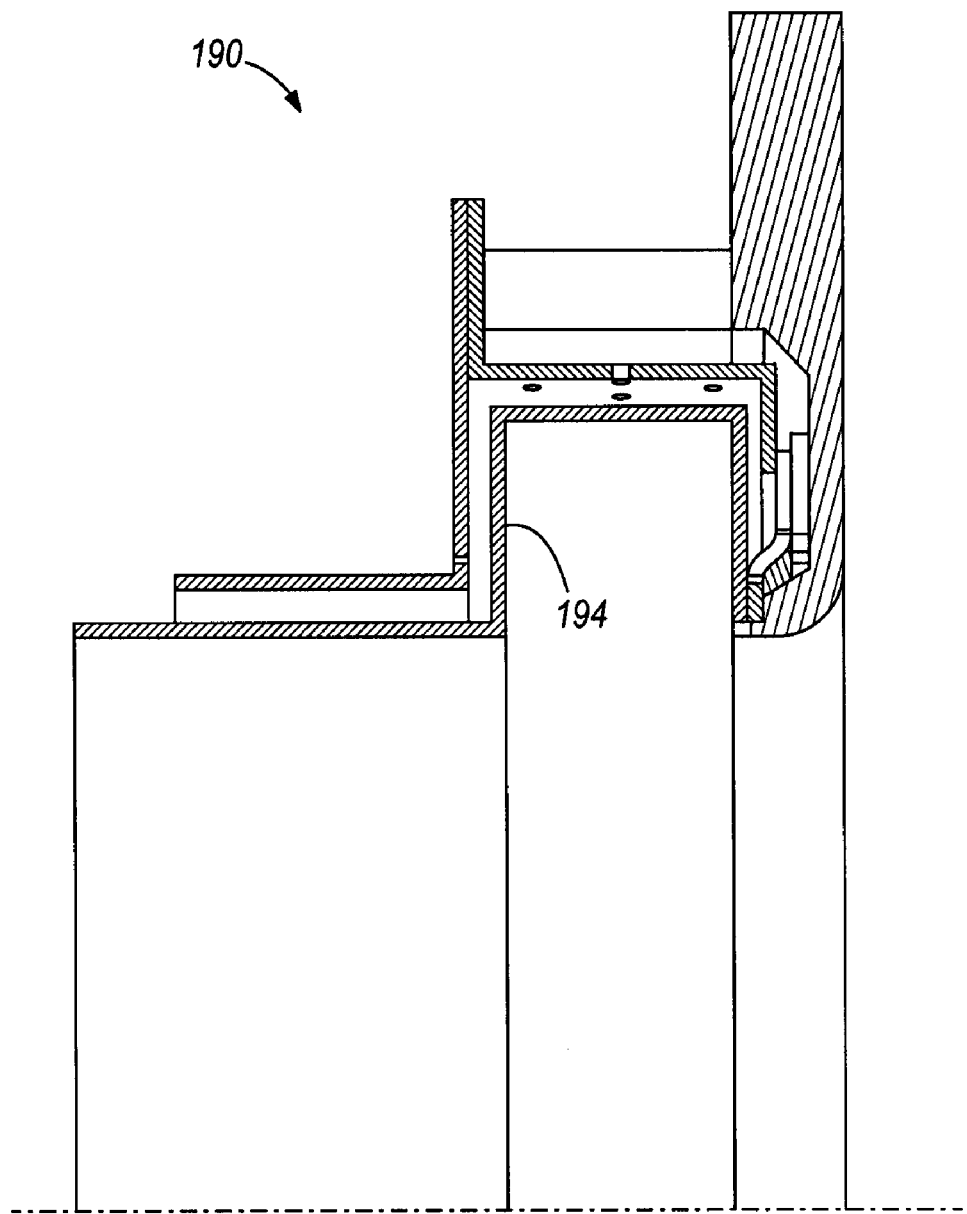
FIG. 10 is a sectional view of a trapped vortex chamber according to another embodiment of the invention.

FIG. 10 illustrates a trapped vortex chamber 190 according to another embodiment of the invention. Trapped vortex chamber 190 is generally similar in form and function to trapped vortex chamber 90, with the exception that an inner profile of the wall 194 is approximately square or rectangular rather than semi-circular as illustrated in FIG. 8.

In addition to a single can combustor, can-annular combustor arrangements are commonly used, where multiple single combustor cans are oriented upstream of an annular combustor liner. Transition hardware is used to convey the combustion gases from the individual cans to the annular portion of the combustor. The annular portion of the combustor then conveys hot gases to a turbine, typically with the use of turbine nozzles or turbine vanes. The invention disclosed herein is applicable to can-annular combustors, applying to the upstream portion where fuel and air are injected and flow stabilization occurs.

The present invention addresses the issue of LP and LPP combustion (premixed combustion) by increasing the fuel/air range where a combustor will not produce high levels of NOx and will not extinguish (LBO). This permits a gas turbine to operate over a wider range of power without the need for a diffusion pilot feature. This method of lean combustion uses a highly swirled mixture of fuel/air in combination with a trapped vortex cavity to increase flame stability. Two flame-holding features (central recirculation zone, trapped vortex combustion) enhance the stability of the LP system.

Thus, the invention provides, among other things, a method and apparatus to combust lean mixtures of fuel and air stably in a gas turbine engine for power generating equipment including microturbines. Various features and advantages of the invention are set forth in the following claims.

What is claimed is:

1. A combustor for combusting a mixture of fuel and air, the combustor comprising:
    a swirlerhead for receiving a flow of air and a flow of fuel, the fuel and air being mixed together under the influence of the swirlerhead, the swirlerhead comprising a plurality of swirler slots configured to impart a swirling flow to the fuel/air mixture;
    a prechamber in fluid communication with the swirlerhead for receiving the swirling fuel/air mixture, the prechamber being a cylindrical member oriented along a central axis and having an inner imperforate wall and an outer wall, the prechamber configured to impart an axial flow to the swirling fuel/air mixture in a downstream direction along the central axis, thereby creating a vortex flow of the fuel/air mixture having a low pressure region along the central axis;
    a combustion chamber in fluid communication with and downstream of the prechamber, the combustion chamber having an outer wall coupled to the outer wall of the prechamber, the combustion chamber having a greater flow area than a flow area of the prechamber, thereby permitting the vortex to expand radially and create a recirculation zone in which combustion products from combustion of the fuel/air within the combustion chamber are drawn upstream along the central axis back into the prechamber; and
    a trapped vortex chamber disposed radially outwardly from the prechamber, the trapped vortex chamber being partially defined by the inner imperforate wall of the prechamber, the trapped vortex chamber configured to receive fuel/air from an outer perimeter of the vortex into the cavity and to exhaust combustion products into the vortex.

2. The combustor of claim 1, further comprising a rotating, swirling trapped vortex flow of fuel and air within the trapped vortex chamber.

3. The combustor of claim 2, wherein the vortex flow has a higher density than the trapped vortex flow.

4. The combustor of claim 2, wherein the trapped vortex flow has a higher temperature than the vortex flow.

5. The combustor of claim 2, wherein the vortex flow is bordered at an inner perimeter by the recirculation flow and at an outer perimeter by the trapped vortex flow.

6. The combustor of claim 2, wherein the trapped vortex flow is an autoigniting trapped vortex flow.

7. The combustor of claim 1, wherein the trapped vortex chamber has a semi-circular inner profile.

8. The combustor of claim 1, wherein the trapped vortex chamber has a rectangular inner profile.

9. The combustor of claim 1, further comprising a cooling mechanism for cooling the trapped vortex chamber.

10. The combustor of claim 9, wherein the the outer wall of the prechamber is spaced apart from the inner imperforate wall defining a flowpath between the inner imperforate wall and the outer wall of the prechamber.

11. The combustor of claim 10, wherein the flowpath is in fluid communication with a source of recuperated air or compressor discharge air.

12. The combustor of claim 10, wherein the flowpath exhausts into the combustion chamber downstream of the prechamber.

* * * * *